United States Patent
Jain et al.

(10) Patent No.: US 10,824,950 B2
(45) Date of Patent: Nov. 3, 2020

(54) SYSTEM AND METHOD FOR DEPLOYING A DATA ANALYTICS MODEL IN A TARGET ENVIRONMENT

(71) Applicant: HCL TECHNOLOGIES LIMITED, Uttar Pradesh (IN)

(72) Inventors: Parveen Kumar Jain, Uttar Pradesh (IN); Arvind Maurya, Uttar Pradesh (IN); Vidhi Bajaj, Uttar Pradesh (IN)

(73) Assignee: HCL TECHNOLOGIES LIMITED (IN)

( * ) Notice: Subject to any disclaimer, the term of this patent is extended or adjusted under 35 U.S.C. 154(b) by 37 days.

(21) Appl. No.: 16/287,756

(22) Filed: Feb. 27, 2019

(65) Prior Publication Data

US 2019/0272471 A1    Sep. 5, 2019

(30) Foreign Application Priority Data

Mar. 1, 2018    (IN) .............................. 201811007710

(51) Int. Cl.

| | |
|---|---|
| *G06N 5/04* | (2006.01) |
| *G06F 16/25* | (2019.01) |
| *G06F 16/21* | (2019.01) |
| *G06N 20/00* | (2019.01) |
| *G06F 16/2457* | (2019.01) |
| *G06F 8/61* | (2018.01) |
| *G06F 16/2458* | (2019.01) |

(52) U.S. Cl.
CPC ................. *G06N 5/04* (2013.01); *G06F 8/64* (2013.01); *G06F 16/212* (2019.01); *G06F 16/2465* (2019.01); *G06F 16/24578* (2019.01); *G06F 16/254* (2019.01); *G06N 20/00* (2019.01)

(58) Field of Classification Search
CPC ...... G06F 16/212; G06F 16/254; G06N 20/00
See application file for complete search history.

(56) References Cited

U.S. PATENT DOCUMENTS

| | | |
|---|---|---|
| 6,243,696 B1 | 6/2001 | Keeler et al. |
| 7,092,941 B1 | 8/2006 | Campos |
| (Continued) | | |

OTHER PUBLICATIONS

Article entitled "Cognitive Analytics: Going Beyond Big Data Analytics and Machine Learning", by Gudivada et al., Copyright 2016.*

*Primary Examiner* — Mahesh H Dwivedi
(74) *Attorney, Agent, or Firm* — Hayes Soloway P.C.

(57) ABSTRACT

The present disclosure relates to system(s) and method(s) for deploying a data analytics model in a target environment. The system records a set of data pre-processing stages, associated with the data analytics model. The set of data pre-processing stages may comprise receiving raw data, executing a set of ETL functions on the raw data, and executing a set of algorithms on the raw data. Further, the system generates the data analytics model based on the set of algorithms. Furthermore, the system generates a scoring engine workflow, associated with the data analytics model, based on the set of data pre-processing stages. The scoring engine workflow comprises one or more ETL functions and one or more algorithms. Further, the system deploys the data analytics model and the scoring engine workflow in the target environment. The scoring engine workflow enables pre-processing of production data in the target environment.

11 Claims, 5 Drawing Sheets

(56) References Cited

U.S. PATENT DOCUMENTS

| | | | |
|---|---|---|---|
| 8,417,715 B1* | 4/2013 | Bruckhaus | G06Q 30/0202 |
| | | | 707/758 |
| 9,306,965 B1 | 4/2016 | Grossman et al. | |
| 9,436,507 B2 | 9/2016 | Mishra et al. | |
| 2003/0220860 A1* | 11/2003 | Heytens | G06Q 30/0201 |
| | | | 705/35 |
| 2011/0119300 A1* | 5/2011 | Marcade | G06Q 30/02 |
| | | | 707/769 |
| 2013/0317803 A1 | 11/2013 | Manley et al. | |
| 2014/0317046 A1* | 10/2014 | Benke | G06F 16/254 |
| | | | 707/602 |
| 2016/0055426 A1* | 2/2016 | Aminzadeh | G06N 7/005 |
| | | | 706/12 |
| 2016/0350671 A1* | 12/2016 | Morris, II | G05B 23/0229 |
| 2017/0109657 A1* | 4/2017 | Marcu | G06F 8/30 |
| 2017/0177309 A1 | 6/2017 | Bar-Or et al. | |
| 2018/0053401 A1* | 2/2018 | Martin | G08B 29/188 |
| 2018/0357559 A1* | 12/2018 | Truong | G06N 3/0454 |
| 2019/0213198 A1* | 7/2019 | Kannan | G06F 11/30 |

* cited by examiner

SYSTEM AND METHOD FOR DEPLOYING A DATA ANALYTICS MODEL IN A TARGET ENVIRONMENT

CROSS-REFERENCE TO RELATED APPLICATIONS AND PRIORITY

The present application claims benefit from Indian Complete Patent Application 201811007710 filed on Mar. 1, 2018 the entirely of which is hereby incorporated by reference.

TECHNICAL FIELD

The present disclosure in general relates to the field of data analytics. More particularly, the present invention relates to a system and method for deploying a data analytics model in a target environment.

BACKGROUND

Generally, a data analytics model is build using historical data received from different data sources. Further, a data scientist uses the historical data to validate the data analytics model. Once the data analytics model is validated, the data analytics model is deployed to a target platform to process new data for predictions. However, during the process of predictions, the new data cannot be directly passed to the data analytics model. The new data needs to be converted into a format compatible with the data analytics model. It may be understood that data pre-processing functions need to be executed on the new data to make the new data compatible with the data analytics model. The data pre-processing functions are associated with the functions used for building the data analytics model. Currently, the data scientist writes a document describing the data pre-processing functions used for building the data analytics model. Further, the IT/Software engineers use the document to convert the new data into the format compatible with the data analytics model before the process of the predictions.

Further, PMML (Predictive Model Mark-up Language) based system is used to enable seamless porting and deployment of the data analytics model, But, the PMML based system fails to capture all the data pre-processing functions used for building the data analytics model. Also, a third party platform is required to execute the data pre-processing functions.

SUMMARY

Before the present systems and methods for deploying a data analytics model in a target environment, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for deploying the data analytics model in the target environment. This summary is not intended to identify essential features of the claimed subject matter nor is it intended for use in determining or limiting the scope of the claimed subject matter.

In one implementation, a method for deploying a data analytics model in a target environment is illustrated. In one embodiment, the method may comprise recording a set of data pre-processing stages associated with the data analytics model. In one aspect, the set of data pre-processing stages may be captured at the time of building the data analytics model. In one embodiment, the set of data pre-processing stages may comprise receiving raw data from a set of sources. Once the raw data is received, the set of data pre-processing stages may comprise executing a set of ETL (Extract, Transform and Load) functions on the raw data. The set of ETL functions may comprise one or more transformation functions. The one or more transformation functions may be configured to process the raw data to generate transform data. Further, the set of data pre-processing stages may comprise executing a set of machine learning algorithms on the transform data to build the data analytics model. Further, the method may comprise generating a scoring engine workflow associated with the data analytics model based on the set of data pre-processing stages. The scoring engine workflow may comprise one or more ETL functions, from the set of ETL functions, and one or more machine learning algorithms, from the set of machine learning algorithms. In one aspect, the one or more ETL functions and the one or more machine learning algorithms may be used for building the data analytics model. Furthermore, the method may comprise deploying the data analytics model and the scoring engine workflow in the target environment. The scoring engine workflow may enable pre-processing of production data received at the target environment.

In one implementation, a system for deploying a data analytics model in a target environment is illustrated. The system comprises a memory and a processor coupled to the memory, further the processor is configured to execute programmed instructions stored in the memory. In one embodiment, the processor may execute programmed instructions stored in the memory for recording a set of data pre-processing stages associated with the data analytics model. In one aspect, the set of data pre-processing stages may be captured at the time of building the data analytics model. In one embodiment, the set of data pre-processing stages may comprise receiving raw data from a set of sources. Once the raw data is received, the set of data pre-processing stages may comprise executing a set of ETL (Extract, Transform and Load) functions on the raw data. The set of ETL functions may comprise one or more transformation functions. The one or more transformation functions may be configured to process the raw data to generate transform data. Further, the set of data pre-processing stages may comprise executing a set of machine learning algorithms on the transform data to build the data analytics model. Further, the processor may execute programmed instructions stored in the memory for generating a scoring engine workflow associated with the data analytics model based on the set of data pre-processing stages. The scoring engine workflow may comprise one or more ETL functions, from the set of ETL functions, and one or more machine learning algorithms, from the set of machine learning algorithms. In one aspect, the one or more ETL functions and the one or more machine learning algorithms may be used for building the data analytics model. Furthermore, the processor may execute programmed instructions stored in the memory for deploying the data analytics model and the scoring engine workflow in the target environment. The scoring engine workflow may enable pre-processing of production data received at the target environment.

In yet another implementation, a computer program product having embodied computer program for deploying a data analytics model in a target environment is disclosed. In one embodiment, the program may comprise a program code for recording a set of data pre-processing stages associated with the data analytics model. In one aspect, the set of data pre-processing stages may be captured at the time of building the data analytics model. In one embodiment, the set of data pre-processing stages may comprise receiving raw data from a set of sources. Once the raw data is received, the set of data pre-processing stages may comprise executing a set of ETL (Extract, Transform and Load) functions on the raw data. The set of ETL functions may comprise one or more transformation functions. The one or more transformation functions may be configured to process the raw data to generate transform data. Further, the set of data pre-processing stages may comprise executing a set of machine learning algorithms on the transform data to build the data analytics model. Further, the program may comprise a program code for generating a scoring engine workflow associated with the data analytics model based on the set of data pre-processing stages. The scoring engine workflow may comprise one or more ETL functions, from the set of ETL functions, and one or more machine learning algorithms, from the set of machine learning algorithms. In one aspect, the one or more ETL functions and the one or more machine learning algorithms may be used for building the data analytics model. Furthermore, the program may comprise a program code for deploying the data analytics model and the scoring engine workflow in the target environment. The scoring engine workflow may enable pre-processing of production data received at the target environment.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "recording", "receiving", "executing", "analysing", "generating", "deploying" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for deploying a data analytics model in a target environment are now described. The disclosed embodiments of the system and method for deploying the data analytics model in the target environment are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for deploying a data analytics model in a target environment is not intended to be limited to the embodiments illustrated, but is to be accorded the widest scope consistent with the principles and features described herein.

The present subject matter relates to deploying a data analytics model in a target environment. In one embodiment, a set of data pre-processing stages associated with the data analytics model may be recorded. The set of data pre-processing stages may comprise receiving raw data from a set of sources. Further, a set of ETL (Extract, Transform and Load) functions may be executed on the raw data. In one aspect, one or more transformation functions may be configured to process the raw data to generate transform data. Further, a set of machine learning algorithms may be executed on the transform data to build the data analytics model. Once the set of data pre-processing stages, a scoring engine workflow, associated with the data analytics model, may be generated. The scoring engine workflow may comprise one or more ETL functions, from the set of ETL functions, and one or more machine learning algorithms, from the set of machine learning algorithms. Further, the data analytics model and the scoring engine workflow may be deployed in the target environment. In one aspect, the scoring engine workflow may be configured to enable pre-processing of production data in the target environment. Further, the network implementation of system for deploying a data analytics model in a target environment is illustrated with FIG. 1.

Figure 1:
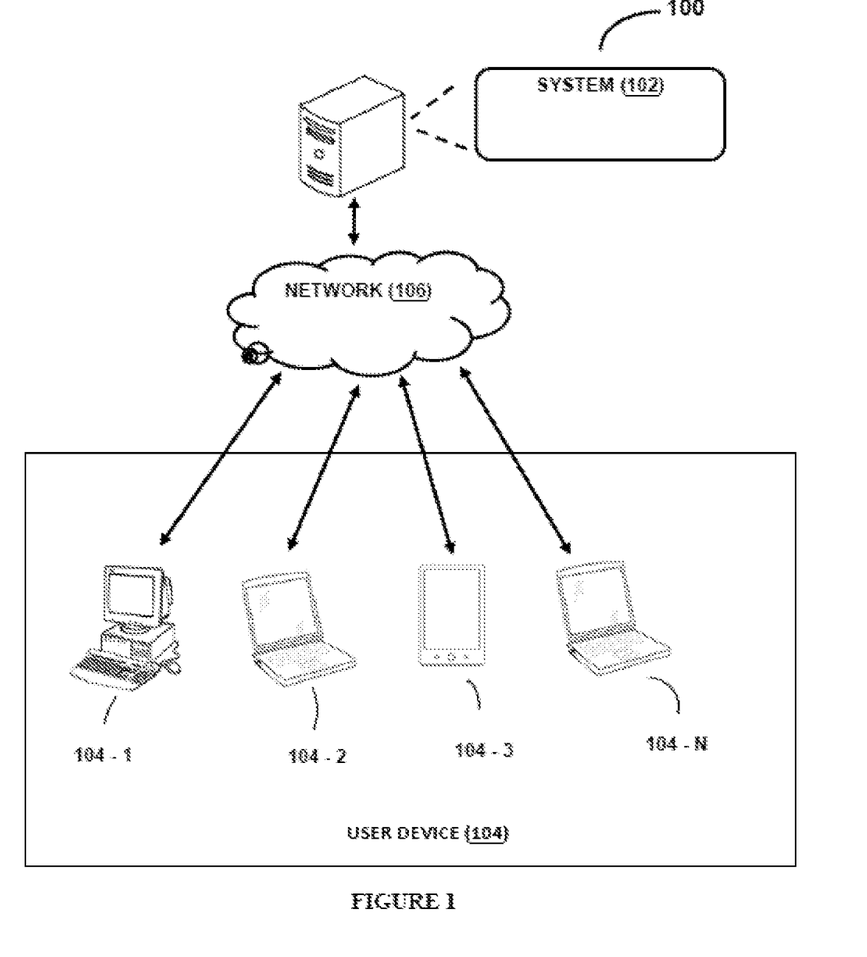
FIG. 1 illustrates a network implementation of a system for deploying a data analytics model in a target environment, in accordance with an embodiment of the present subject matter.

Referring now to FIG. 1, a network implementation 100 of a system 102 for deploying a data analytics model in a target environment is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may be configured to record a set of data pre-processing states, associated with the data analytics model. The set of data pre-processing stages may be recorded at the time of building the data analytics model. In one aspect, the set of data pre-processing stages may comprise receiving raw data from a set of sources. In the aspect, the set of data pre-processing stages may comprise executing a set of ETL (Extract, Transform and Load) functions on the raw data. In one example, the set of ETL functions may comprise feature extraction, from the raw data, dimension change, associated with the raw data, and the like. In one embodiment, the data pre-processing stages may comprise extraction of a feature name, a derived feature name, a data type corresponding to the feature name, a derived data type corresponding to the derived feature name and the like. Further, the set of ETL functions may comprise one or more transformation functions. The one or more transformation functions may be configured to process the raw data. In one example, the processing of the raw data may comprise scaling, categorising and the like. Based on the processing of the raw data, the one or more transformation functions may be configured to generate transform data. In the aspect, the set of data pre-processing stages may further comprise executing a set of machine learning algorithms on the transform data. In one example, the set of machine learning algorithms may comprise K-means algorithm, Decision tree algorithm and the like. Further, the data analytics model may be build based on the execution of the set of machine learning algorithms.

Upon recording the set of data pre-processing stages, the system 102 may be configured to generate a scoring engine workflow. The scoring engine workflow may be associated with the data analytics model. The scoring engine workflow may be generated based on the set of data pre-processing stages. In one aspect, the scoring engine workflow may comprise one or more ETL functions, from the set of ETL functions, and one or more machine learning algorithms, from the set of machine learning algorithms In one example, the one or more ETL functions and the one or more machine learning algorithms may be used for building the data analytics model.

Further, the system 102 may be configured to deploy the data analytics model and the scoring engine workflow in the target environment. Once the data analytics model is deployed, the scoring engine workflow may enable pre-processing of production data, in the target environment. In one aspect, the scoring engine workflow may be executed to make the production data compatible with the data analytics model. Further, the data analytics model may process the production data, compatible with the data analytics model, for data prediction. Further, the system for developing and deploying a data analytics model in a target environment is elaborated with respect to FIG. 2.

Figure 2:
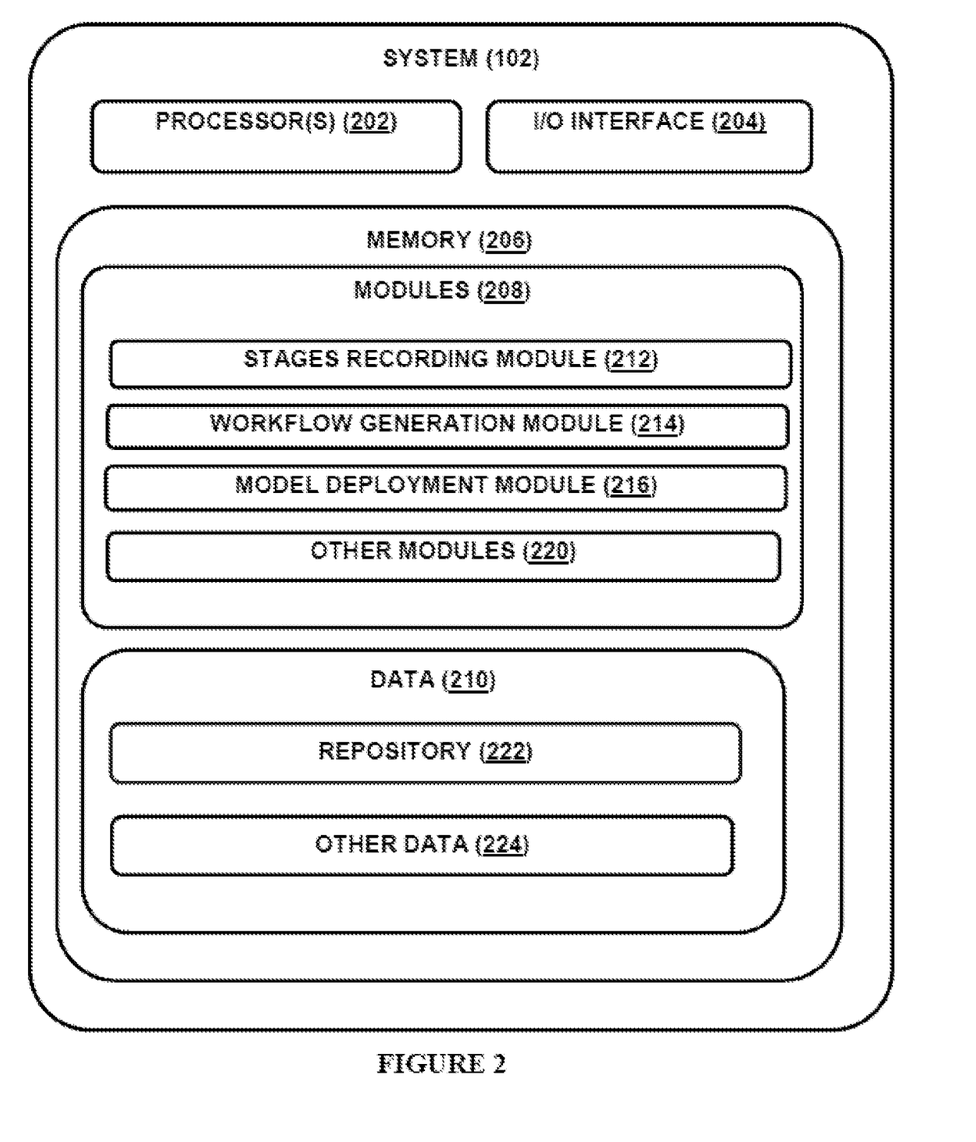
FIG. 2 illustrates the system for developing and deploying the data analytics model in the target environment, in accordance with an embodiment of the present subject matter.

Referring now to FIG. 2, the system 102 for developing and deploying a data analytics model in a target environment is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a stages recording module 212, a workflow generation module 214, a model deployment module 216, and other modules 220. The other modules 220 may include programs or coded instructions that supplement applications and functions of the system 102.

The data 210, amongst other things, serve as a repository for storing data processed, received, and generated by one or more of the modules 208. The data 210 may also include a repository 222, and other data 224. In one embodiment, the other data 224 may include data generated as a result of the execution of one or more modules in the other modules 220.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the stages recording module 212 may be configured to record a set of data pre-processing stages, associated with the data analytics model. The set of data pre-processing stages may be recorded at the time of building the data analytics model. In one example, the set of data pre-processing stages may correspond to one or more stages executed during the building of the data analytics model. In one example, if the data analytics model is already build, then the set of data pre-processing stages may be recorded based on analysing the data analytics model.

Further, the set of data pre-processing stages may comprise receiving raw data from a set of sources. In one implementation, the stages recording module 212 may be configured to record the stage of receiving the raw data. In one example, the raw data may correspond to historical data from the set of sources.

Once the raw data is received, the set of data pre-processing stages may comprise executing a set of ETL (Extract, Transform and Load) functions on the raw data. In one implementation, the stages recording module 214 may be configured to record the stage of executing the set of ETL functions on the raw data. In one embodiment, the execution of each ETL function, from the set of ETL functions, may correspond to extraction of the raw data, transformation of the raw data into transform data, and loading the transform data in the repository. In one example, the set of ETL functions may comprise feature extraction, from the raw data, dimension change of the raw data, and the like. In another example, the set of data pre-processing stages may comprise extracting a feature name, a derived feature name, a data type corresponding to the feature name, a derived data type corresponding to the derived feature name and the like. In one aspect, the set of ETL functions may comprise one or more transformation functions. The one or more transformation functions may be configured to process the raw data. Further, the one or more transformation functions may generate the transform data based on the processing of the raw data. In one example, the one or more transformation functions may correspond to scaling the raw data, categorising the raw data and the like. In one embodiment, the execution of the set of ETL functions may be an iterative step.

Once the set of ETL functions are executed on the raw data, and the transform data is generated, the transform data may be categorized into train data and test data. The train data may be further configured to build the data analytics model. The test data may be further configured to validate the data analytics model.

Further, the set of data pre-processing stages may comprise executing a set of machine learning algorithms on the transform data. In one implementation, the stages recording module 212 may be configured to record the stage of execution of the set of machine learning algorithms In one example, the set of machine learning algorithms may be executed on the train data. In one aspect, the set of machine learning algorithms may correspond to K-means algorithm, decision tree algorithm and the like. In one example, the set of machine learning algorithms may be executed on the train data. Further, the data analytics model may be build based on the execution of the set of machine learning algorithms.

Once the data analytics model is build, the test data may be configured to validate the data analytics model. In one embodiment, if any error occurs, during the validation, or if the validation fails, then the data analytics model may be rebuild based on execution of the ETL functions and the machine learning algorithms.

Upon recording the set of data pre-processing stages, the workflow generation module 214 may be configured to generate a workflow based on the set of data pre-processing stages. The workflow may be referred as a scoring engine workflow. The scoring engine workflow may be associated with the data analytics model. In one embodiment, the scoring engine workflow may comprise one or more ETL functions, from the set of ETL functions, and one or more machine learning algorithms, from the set of machine learning algorithms. In one example, the one or more ETL functions and the one or more machine learning algorithms may correspond to ETL functions and machine learning algorithms used at the time of building the data analytics model. In other words, the one or more ETL functions and the one or more machine learning algorithms may be final ETL functions and final machine learning algorithm executed during the building of the data analytics model.

In one embodiment, the scoring engine workflow may comprise the one or more ETL functions and the one or more machine learning algorithms in a sequence as executed during the building of the data analytics model. The scoring engine workflow may be independent of a language used to build the data analytics model. The scoring engine workflow may be a JSON/XML predictive file. The JSON/XML based predictive file may be configured to describe the scoring engine workflow in an interchange format. In one example, the scoring engine workflow may be independent of an execution environment associated with the data analytics model.

Further, the model deployment module 216 may be configured to deploy the data analytics model and the scoring engine workflow in the target environment. The scoring engine workflow may be further configured to pre-process production data, received at the target environment. In one example, the production data may correspond to real-time data, associated with the target environment. In one aspect, the real-time data may be pre-processed to make the production data compatible with the data analytics model. Once the production data is pre-processed using the scoring engine workflow, the data analytics model may further process the production data for data predictions.

In one embodiment, once the data analytics model is deployed in the target environment, the model deployment model 216 may execute the scoring engine workflow, associated with the data analytics model. In one aspect, the production data is received from one or more sources. Once the production data is received, one or more ETL functions may be executed on the production data. In one example, one or more transformations may be executed on the production data to convert the production data into transform data. The transform data may correspond to the production data compatible with the data analytics model. Further, one or more machine learning algorithms may be executed on the transform data, and the transform data may be passed to the data analytics model for processing. The data analytics model may further analyse the transform data for the data prediction. Further, an output may be generated at the data analytics model based on the data predictions and the production data. In other words, the set of data pre-processing stages captured during building of the data analytics model may be executed on the production data, in the target environment, to make the production data compatible with the data analytics model.

In one exemplary embodiment, construe a system for deployment of a data analytics model to predict a probability of vehicle servicing. The stages recording module 212 may be configured to record a set of data pre-processing stages at the time of building the data analytics model. In this case, the stage recording module 212 may record the stage of receiving raw data from one or more vehicles. In one aspect, the raw data may comprise speed, number of times the gear is operated, quantity of fuel in vehicle and the like. In one example, the one or more vehicles may be running in different conditions. Once the raw data is received, the stages recording module 212 may be configured to record the stage of executing a set of ETL functions on the raw data, associated with the one or more vehicles. In one aspect, one or more transformations may be configured to process the raw data to transform the raw data into transform data. Further, the stages recording module 212 may be configured to record the stage of executing a set of machine learning algorithms on the transform data. Based on execution of the set of machine learning algorithms, the data analytics model may be generated.

Further, the workflow generation module 214 may be configured to generate a scoring engine workflow. The scoring engine workflow may comprise one or more ETL functions and one or more machine learning algorithms used for building the data analytics model.

Furthermore, the model deployment module 216 may be configured to deploy the data analytics model in a target environment. In one example, the target environment may be a vehicle. Once the data analytics model is deployed, the scoring engine workflow may be executed. In one aspect, the data analytics model may receive real-time data from the vehicle. Further, the one or more ETL functions and the one or more machine learning algorithms may be executed on the real-time data. In one embodiment, the one or more ETL functions and the one or more machine learning algorithms may be executed to make the real-time data compatible with the data analytics model. Further, the real-time data may be passed to the data analytics model. The data analytics model may further process the real-time data for data prediction. Further, an output may be generated based on the real-time data and the data predictions. In this case, the output may indicate that vehicle need servicing after 20 days.

Exemplary embodiments discussed above may provide certain advantages. Though not required to practice aspects of the disclosure, these advantages may include those provided by the following features.

Some embodiments of the system and the method enables generating a workflow with pre-processing stages and executing the workflow in the target environment to make real-time data compatible with the data analytics model.

Some embodiments of the system and the method enables generating the workflow in a common language independent of language used for building the data analytics model.

Figure 3:
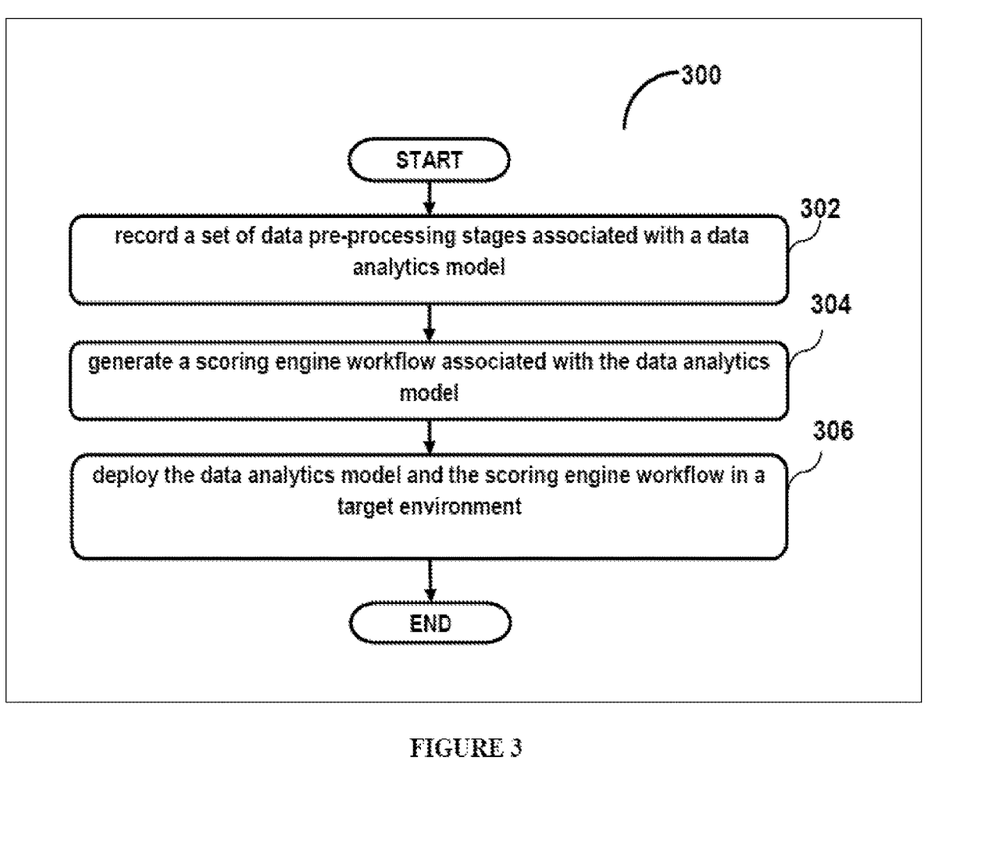
FIG. 3 illustrates a method for recording scoring workflow and deploying the data analytics model in the target environment, in accordance with an embodiment of the present subject matter.

Referring now to FIG. 3, a method 300 for recording scoring work-flow and deploying a data analytics model in a target environment, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, a set of data pre-processing stages, associated with the data analytics model, may be recorded. In one implementation, the stages recording module 212 may be configured to record the set of data pre-processing stages. The set of data pre-processing stages may be recorded at the time of building the data analytics model. Further, the set of data pre-processing stages may comprise receiving raw data from a set of sources. Once the raw data is received, the set of data pre-processing stages may comprise executing a set of ETL (Extract, Transform and Load) functions on the raw data. In one aspect, the set of ETL functions may comprise one or more transformation functions. The one or more transformation functions may generate the transform data based on processing of the raw data. Further, the set of data pre-processing stages may comprise executing a set of machine learning algorithms on the transform data. Further, the data analytics model may be build based on the execution of the set of machine learning algorithms.

At block 304, a scoring engine workflow may be generated based on the set of data pre-processing stages. In one implementation, the workflow generation module 214 may be configured to generate the scoring engine workflow. The scoring engine workflow may be associated with the data analytics model. In one embodiment, the scoring engine workflow may comprise one or more ETL functions, from the set of ETL functions, and one or more machine learning algorithms, from the set of machine learning algorithms.

At block 306, the data analytics model and the scoring engine workflow may be deployed in the target environment. In one implementation, the model deployment module 216 may be configured to deploy the data analytics model and the scoring engine workflow in the target environment. The scoring engine workflow may be further configured to pre-process production data, received at the target environment. In one aspect, the production data may be pre-processed to make the production data compatible with the data analytics model. Once the production data is pre-processed using the scoring engine workflow, the data analytics model may further process the production data for data predictions. Further, a scoring engine workflow associated with a data analytics model is illustrated with FIG. 4.

Figure 4:
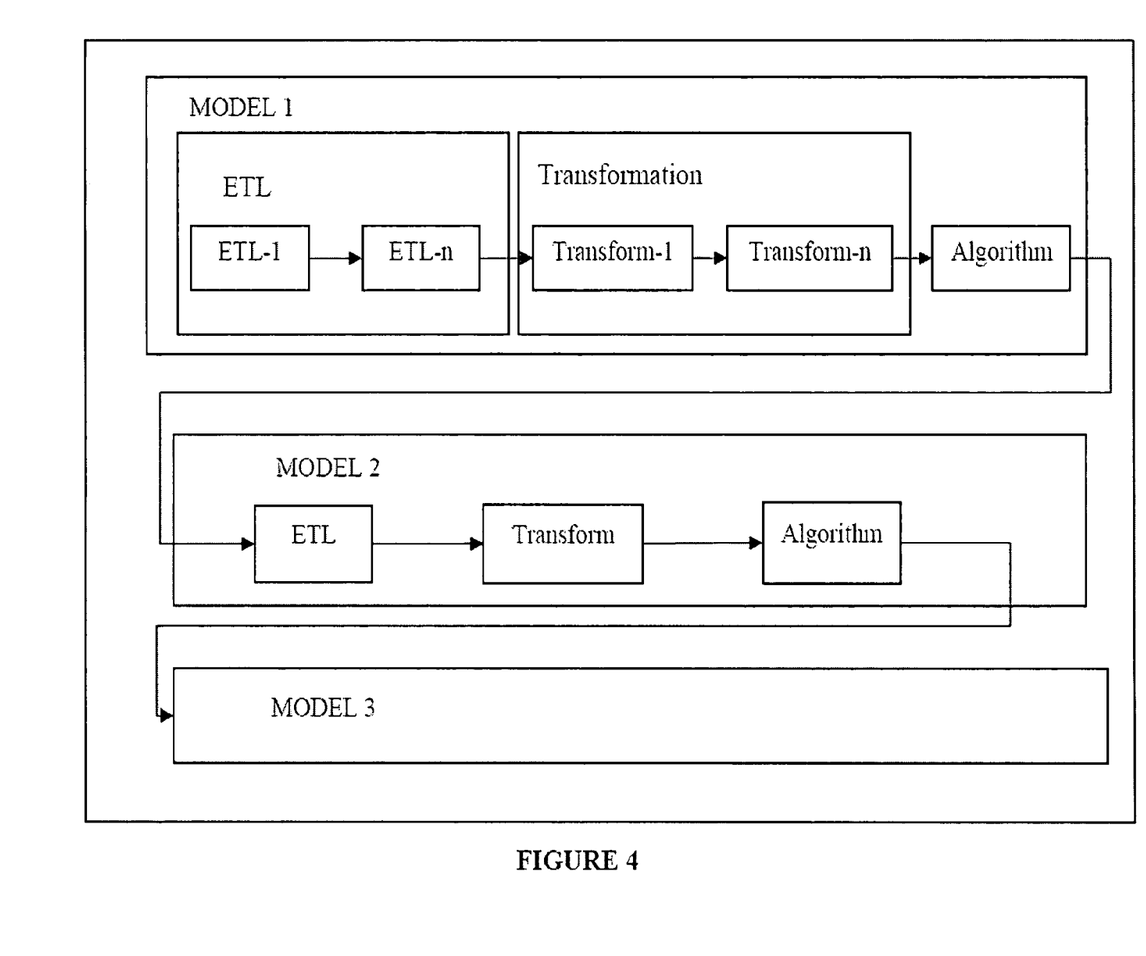
FIG. 4 illustrates a scoring engine workflow associated with the data analytics model, in accordance with an embodiment of the present subject matter.

Referring now to FIG. 4, a scoring engine workflow associated with a data analytics model, is disclosed in accordance with an embodiment of the present subject matter. In one embodiment, a scoring engine may comprise a set of data analytics models. In one example, a number of data analytics model available in the scoring engine may be based on a use case. In this case, the scoring engine may comprise 3 data analytics model referred as a model-1, a model-2, and a model-3. The model-1 may be connected to the model-2, and the model-2 may be further connected to the model-3.

Each data analytics model, from the set of data analytics model, may comprise a workflow associated with the data analytics model. In one example, the workflow is referred as the scoring engine workflow. In one embodiment, the scoring engine workflow, associated with the model-1, may comprise n ETL functions, n transformation functions and one or more algorithms. Further, the scoring engine workflow, associated with the model-2, may comprise one ETL function, one transformation function, and one algorithm. Furthermore, the scoring engine workflow, associated with the model-3, may also comprise a set of ETL functions, a set of transformation functions, and a set of machine learning algorithms.

Further, the scoring engine workflow, associate with the model-1, may be deployed in the target environment. Furthermore, the scoring engine workflow may be configured to process production data in the target environment. In one embodiment, the processing of the production data may correspond to making the production data compatible with the model-1. Furthermore, the scoring engine workflow, associated with the model-2, may be configured to process the production data to make the production data compatible with the model-2. Furthermore, the scoring engine workflow, associated with the model-3, may be configured to process the production data to make the production data compatible with the model-3. Further, a process of analysing production data in a target environment is illustrated with FIG. 5.

Figure 5:
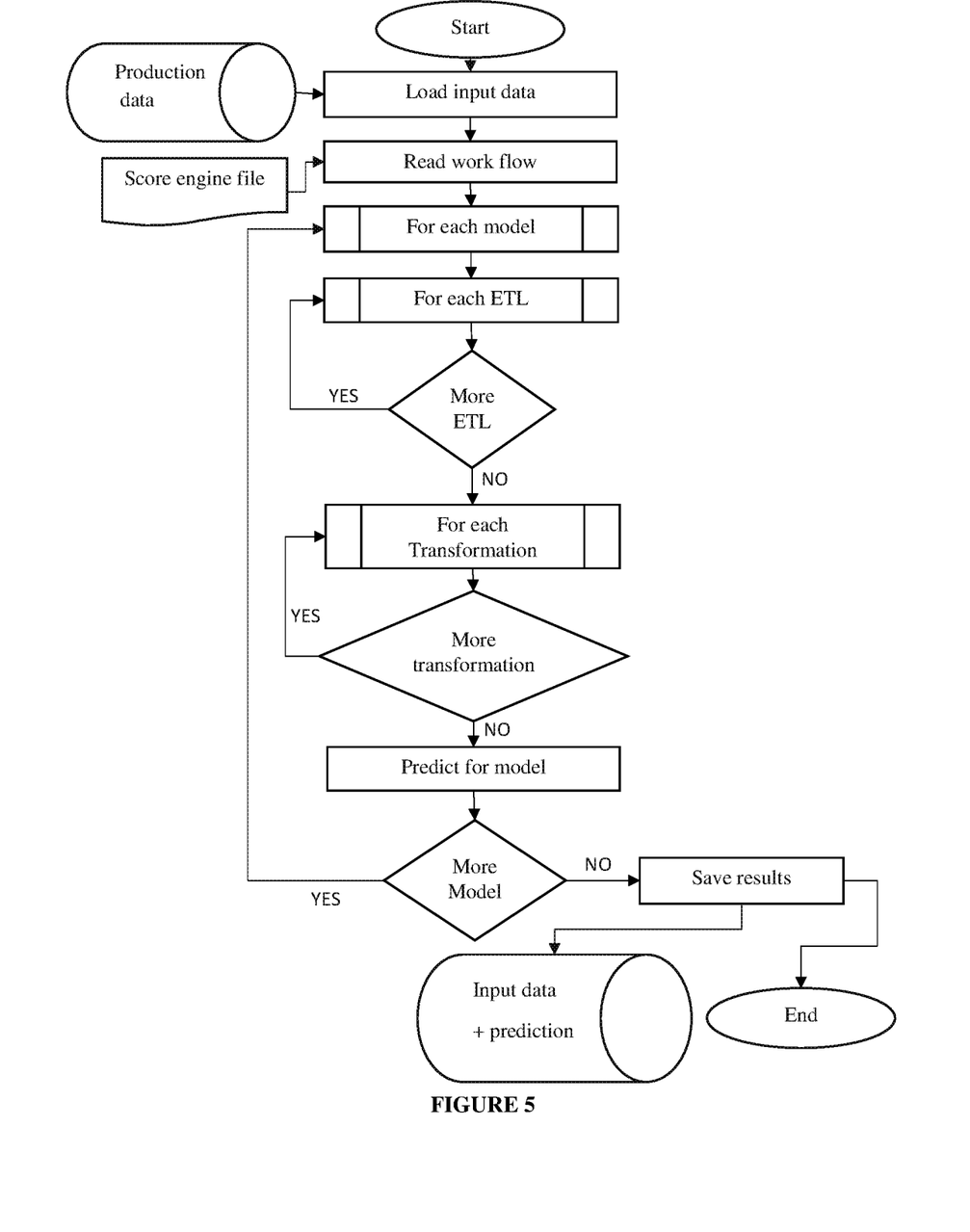
FIG. 5 illustrates a process of analysing production data in the target environment, in accordance with an embodiment of the present subject matter.

Referring now to FIG. 5, a process of analysing production data in a target environment, is disclosed in accordance with an embodiment of the present subject matter. In one embodiment, once a data analytics model is deployed, the production data is received in the target environment. Once the production data is received, a scoring engine workflow, associated with the data analytics model, may be executed. In one embodiment, an ETL function may be executed on the production data. Upon execution of the ETL function, other ETL functions, associated with the data analytics model, may be identified and executed on the production data. Thus, one or more ETL functions, associated with the data analytics model may be executed on the production data. In one aspect, a transformation function may be configured to process the production data. Further, other transformation functions, associated with the data analytics model, may be identified and executed on the production data.

Further, the production data may be processed by the data analytics model for data prediction. Once the data prediction is performed, other data analytics model, available in the scoring engine, may be identified. Further, the scoring engine workflow, associated with the other data analytics model, may be executed. In one embodiment, if other data analytics model is not available in the scoring engine, an output may be generated after processing of the production data with the data analytics model. In another embodiment, if other data analytics model is available in the scoring engine, an output may be generated upon processing of the production data using all the data analytics model, available in the scoring engine.

Although implementations for systems and methods for deploying a data analytics model in a target environment have been described, it is to be understood that the appended claims are not necessarily limited to the specific features or methods described. Rather, the specific features and methods are disclosed as examples of implementations for deploying the data analytics model in the target environment.

The invention claimed is:

1. A method for deploying a data analytics model in a target environment, the method comprises steps of:
recording, by a processor, a set of data pre-processing stages associated with a data analytics model, wherein the set of data pre-processing stages are captured at a time of building the data analytics model, wherein the set of data pre-processing stages comprises:
receiving raw data from a set of sources;
executing a set of ETL (Extract, Transform and Load) functions on the raw data, wherein the set of ETL functions comprise one or more transformation functions, wherein the one or more transformation functions are configured to process the raw data to generate transform data; and
executing a set of machine learning algorithms on the transform data to build the data analytics model;

generating, by the processor, a scoring engine workflow associated with the data analytics model based on the set of data pre-processing stages, wherein the scoring engine workflow comprises one or more ETL functions from the set of ETL functions and one or more machine learning algorithms from the set of machine learning algorithms used for building the data analytics model; and
deploying, by the processor, the data analytics model and the scoring engine workflow in a target environment, wherein the scoring engine workflow enables pre-processing of production data received at the target environment.

2. The method of claim 1, wherein the set of data pre-processing stages comprises: extraction of a feature name, a derived feature name, a data type corresponding to the feature name, and a derived data type corresponding to the derived feature name.

3. The method of claim 1, further comprising:
executing the scoring engine workflow, associated with the data analytics model, to pre-process the production data;
analyzing the pre-processed production data based on the data analytics model for data prediction; and
generating an output based on the data prediction and the production data.

4. The method of claim 1, wherein the scoring engine workflow is independent of language associated with the data analytics model.

5. The method of claim 1, wherein the scoring engine workflow is a JSON/XML based predictive model file.

6. A system for deploying a data analytic model in a target environment, the system comprising:
a memory;
a processor coupled to the memory, wherein the processor is configured to execute programmed instructions stored in the memory to:
record a set of data pre-processing stages associated with a data analytics model, wherein the set of data pre-processing stages are captured at a time of building the data analytics model, wherein the set of data pre-processing stages comprises:
receiving raw data from a set of sources;
executing a set of ETL (Extract, Transform and Load) functions on the raw data, wherein the set of ETL functions comprise one or more transformation functions, wherein the one or more transformation functions are configured to process the raw data to generate transform data; and
executing a set of machine learning algorithms on the transform data to build the data analytics model;
generate a scoring engine workflow associated with the data analytics model based on the set of data pre-processing stages, wherein the scoring engine workflow comprises one or more ETL functions from the set of ETL functions and one or more machine learning algorithms from the set of machine learning algorithms used for building the data analytics model; and
deploy the data analytics model and the scoring engine workflow in a target environment, wherein the scoring engine workflow enables pre-processing of production data received at the target environment.

7. The system of claim 6, wherein the set of data pre-processing stages comprises: extraction of a feature name, a derived feature name, a data type corresponding to the feature name, and a derived data type corresponding to the derived feature name.

8. The system of claim 6, further configured to:
- execute the scoring engine workflow, associated with the data analytics model, to pre-process the production data;
- analyze the pre-processed production data based on the data analytics model for data prediction; and
- generate an output based on the data prediction and the production data.

9. The system of claim 6, wherein the scoring engine workflow is independent of language associated with the data analytics model.

10. The system of claim 6, wherein the scoring engine workflow is a JSON/XML based predictive model file.

11. A non-transitory computer program product having embodied thereon a computer program for deploying a data analytic model in a target environment, the computer program product comprising:
- a program code for recording a set of data pre-processing stages associated with a data analytics model, wherein the set of data pre-processing stages are captured at a time of building the data analytics model, wherein the set of data pre-processing stages comprises:
  - receiving raw data from a set of sources;
  - executing a set of ETL (Extract, Transform and Load) functions on the raw data, wherein the set of ETL functions comprise one or more transformation functions, wherein the one or more transformation functions are configured to process the raw data to generate transform data; and
  - executing a set of machine learning algorithms on the transform data to build the data analytics model;
- a program code for generating a scoring engine workflow associated with the data analytics model based on the set of data pre-processing stages, wherein the scoring engine workflow comprises one or more ETL functions from the set of ETL functions and one or more machine learning algorithms from the set of machine learning algorithms used for building the data analytics model; and
- a program code for deploying the data analytics model and the scoring engine workflow in a target environment, wherein the scoring engine workflow enables pre-processing of production data received at the target environment.

\* \* \* \* \*